United States Patent
Young (10) Patent No.: US 7,819,095 B2
(45) Date of Patent: Oct. 26, 2010

(54) ELECTRONIC VALVE SYSTEM

(75) Inventor: Barry Young, Coventry (GB)

(73) Assignee: Denso Corporation, Kariya (JP)

( * ) Notice: Subject to any disclaimer, the term of this patent is extended or adjusted under 35 U.S.C. 154(b) by 504 days.

(21) Appl. No.: 11/898,848

(22) Filed: Sep. 17, 2007

(65) Prior Publication Data

US 2009/0071422 A1   Mar. 19, 2009

(51) Int. Cl.
F01L 9/04 (2006.01)

(52) U.S. Cl. ............ 123/90.11; 123/90.15; 123/406.12; 251/129.01

(58) Field of Classification Search ............... 123/90.11, 123/90.15, 90.17, 406.12, 406.13, 475; 251/129.01, 251/129.15
See application file for complete search history.

(56) References Cited

U.S. PATENT DOCUMENTS

| | | | |
|---|---|---|---|
| 5,063,901 A * | 11/1991 | Kaneyasu et al. | 123/406.13 |
| 5,611,303 A | 3/1997 | Izuo | |
| 6,435,147 B1 | 8/2002 | Eichenseher et al. | |
| 6,497,214 B2 | 12/2002 | Yagi | |
| 6,662,640 B2 | 12/2003 | Yagi | |
| 6,715,287 B1 | 4/2004 | Engel et al. | |
| 7,021,255 B2 | 4/2006 | Degner et al. | |

FOREIGN PATENT DOCUMENTS

| | | |
|---|---|---|
| JP | 2002-130042 | 5/2002 |
| JP | 2002-201998 | 7/2002 |
| JP | 2002256907 | 9/2002 |
| WO | WO 01/48363 | 7/2001 |

OTHER PUBLICATIONS

Picron, V., Postel, Y.; "Electro-Magnetic Valve Actuation System: Functional characteristics and benefits"; SIA Conference on Variable Valve Actuation; Nov. 30, 2006; pp. 1-10.

* cited by examiner

*Primary Examiner*—Ching Chang
(74) *Attorney, Agent, or Firm*—Nixon & Vanderhye P.C.

(57) ABSTRACT

An internal combustion engine comprises a number of cylinders. The cylinders have electronically activated intake valves. Ignition coils for the cylinders are responsive to respective ignition signals such that charge accumulates in a coil for a cylinder when the ignition signal for the cylinder has a first state and then the charge causes ignition for the cylinder when the ignition signal for the cylinder changes to a second state. In response to detecting an intake valve fault in respect of a cylinder, the ignition signal for the cylinder is held in the first state for a number of cycles of the internal combustion engine, and is then switched to a second state to safely discharge the primary coil without combustion in the cylinder.

19 Claims, 8 Drawing Sheets

ELECTRONIC VALVE SYSTEM

BACKGROUND

1. Field

Non-limiting example embodiments of the present invention relate to the electronic valve systems for an internal combustion engine.

2. Related Art

Conventionally, internal combustion engine valve operation has been controlled using camshafts mechanically linked to the rotation of the engine crankshaft. With the continued aim of engine and vehicle manufacturers to improve engines by way of reducing emissions and fuel consumption, and to increase performance for better driveability, various techniques to improve valve control have been employed, such as, variable valve timing.

In order, further, to provide better control of valve actuation, it is proposed to employ electronic valve actuation systems. Electronic valve actuation is also sometimes known as electro-magnetic valve actuation, electro-mechanical valve actuation, electrical valve actuation and the like. For consistency, the term electronic valve actuation will be used herein. An electronic valve actuation system can be achieved by replacing an intake camshaft with electrically activated valve actuators, for example electromagnetic valve actuators, driven by a valve control unit (VCU). Using information received from an engine control unit (ECU), the VCU can drive the actuators in order to open and close the valves at given lift and transition times in response to valve timing requests from the ECU. The VCU can then inform the ECU of the applied valve timings.

Through such a system, independent open and closing of intake valves at prescribed crankshaft angle timings, transition time and lift can be based on requests from the ECU.

Non-limiting example embodiments of the present invention seek to address the safe operation of an engine with electronic valve actuation in the situation where an intake valve failure occurs.

SUMMARY

An embodiment of an internal combustion engine comprises a number of cylinders. The cylinders have electronically activated intake valves. Ignition coils for the cylinders are responsive to respective ignition signals such that charge accumulates in a coil for a cylinder when the ignition signal for the cylinder has a first state and then the charge causes ignition for the cylinder when the ignition signal for the cylinder changes to a second state. In response to detecting an intake valve fault in respect of a cylinder, the ignition signal for the cylinder is held in the first state for a number of cycles of the internal combustion engine.

Holding the ignition signal in the first state prevents ignition occurring in the cylinder, which in turn could cause ignition of fuel in the intake manifold. Holding the signal in the first state for a number of cycles of the engine allows fuel to dissipate via the cylinder exhaust port(s) before the ignition signal is changed to a second state in which ignition is permitted in the cylinder once more to safely discharge the primary coil without combustion in the cylinder.

An embodiment of the invention can also provide an internal combustion engine having a number of cylinders with electronically activated intake valves, a valve control unit operable to control the electronic valves and an engine control unit operable to generate ignition signals for controlling ignition. The valve control unit is connected by one or more first fault signal paths to the engine control unit to pass a fault signal to the engine control unit when an intake valve fault is detected in respect of at least one cylinder.

BRIEF DESCRIPTION OF THE DRAWINGS

Embodiments of the present invention will now be described by way of example only with reference to the accompanying drawings.

DETAILED DESCRIPTION

An embodiment of the invention can prevent unwanted ignition of fuel in an internal combustion engine cylinder in the event of a fault in an electronically activated intake valve following opening of the valve. In an embodiment of the invention, in response to detection of an intake valve fault in respect of a cylinder, the ignition signal for the cylinder is held in the first state for a number of cycles of the internal combustion engine to permit fuel in the cylinder to dissipate.

Figure 1:
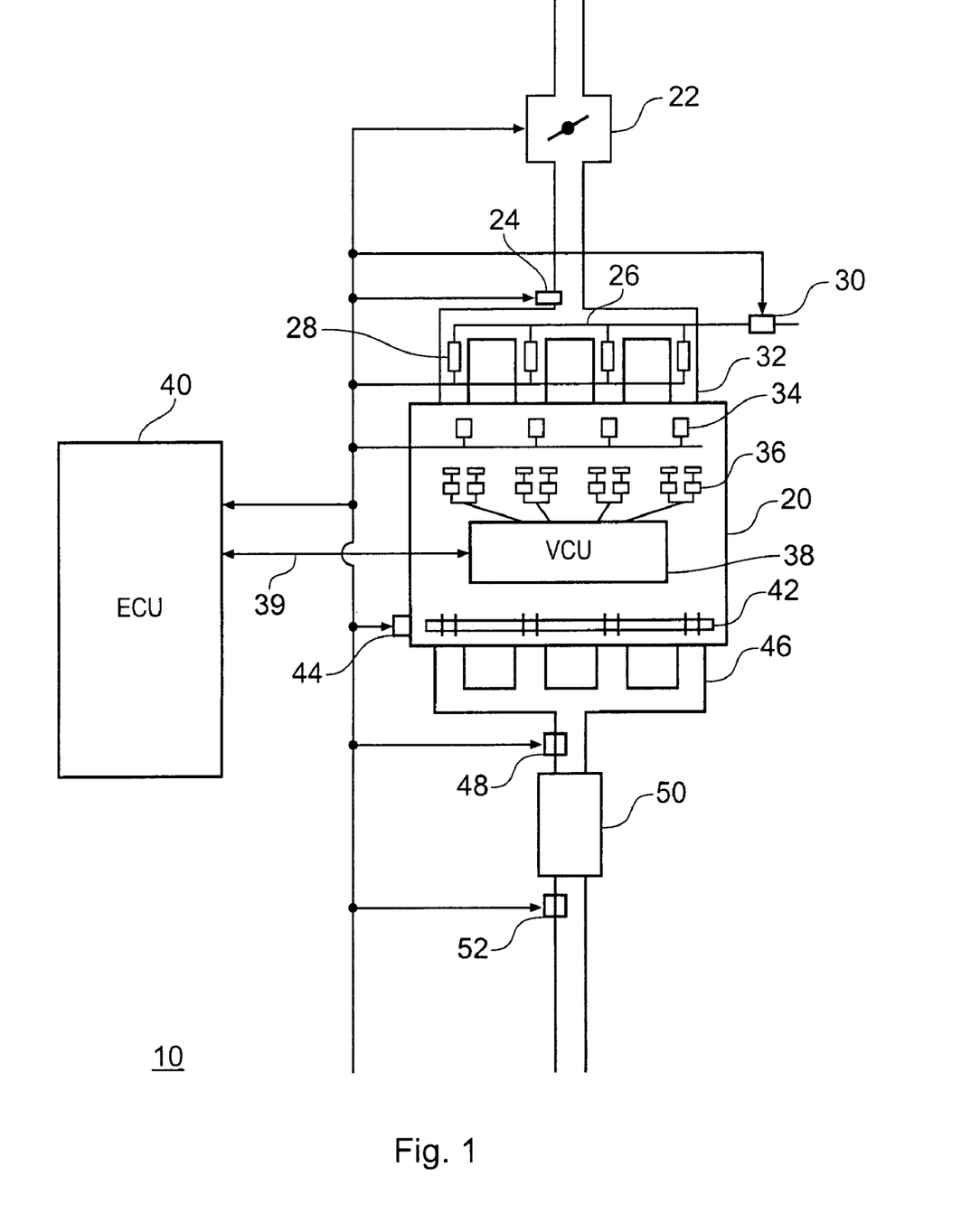
FIG. 1 is a schematic block diagram of an internal combustion engine.

FIG. 1 provides a schematic overview of an electronic valve actuation (EVA) engine system 10. The internal combustion engine 20 represented in FIG. 1 is a four cylinder gasoline engine. The engine system is controlled by an engine control unit 40 which is connected to various sensors and control subsystems of the engine system 10. The ECU controls the operation of a throttle 22 at the intake side of the engine. A manifold pressure sensor 24 in an intake manifold 32 provides control signals to the ECU. A fuel injector 28 for each cylinder is connected to a fuel supply line 26. A pressure regulator 30 is used to control fuel pressure in the fuel supply line 26 and the individual injectors 28 receive control signals from the ECU to control the timed injection of fuel. Spark plugs 34 receive ignition timing (IGT) signals from the ECU 40. In the example illustrated in FIG. 1, two electronically actuated intake valves 36 per cylinder are provided, the electronic intake valves being controlled by a valve control unit 38. The valve control unit 38 is in communication with the engine control unit 40 via a dedicated bus 39.

In the example engine illustrated in FIG. 1, the exhaust valves are controlled by a conventional camshaft 42 which is driven mechanically from the crankshaft (not shown). The engine control unit 40 receives signals from a camshaft sensor 44 indicating the timing of the rotation of the camshaft 42. The engine control unit 40 also receives control signals from a universal exhaust gas oxygen (UEGO) sensor 48 and a heated exhaust gas oxygen (HEGO) sensor 52, either side of a catalytic converter 50, downstream of the exhaust manifold 46.

From the following description, it will be apparent that the internal combustion engine described with reference to FIG. 1 is but one example of an internal combustion engine in accordance with the present invention. For example, although in FIG. 1 a conventional camshaft is used to drive the exhaust valves for the engine, in another example of the invention, the exhaust valves could also be implemented using electronic valve actuators. Also, although in FIG. 1, a four cylinder in-line engine is shown, other embodiments could include engines having another number of cylinders and/or another configuration, for example a V6 or V10 configuration.

Figure 2:
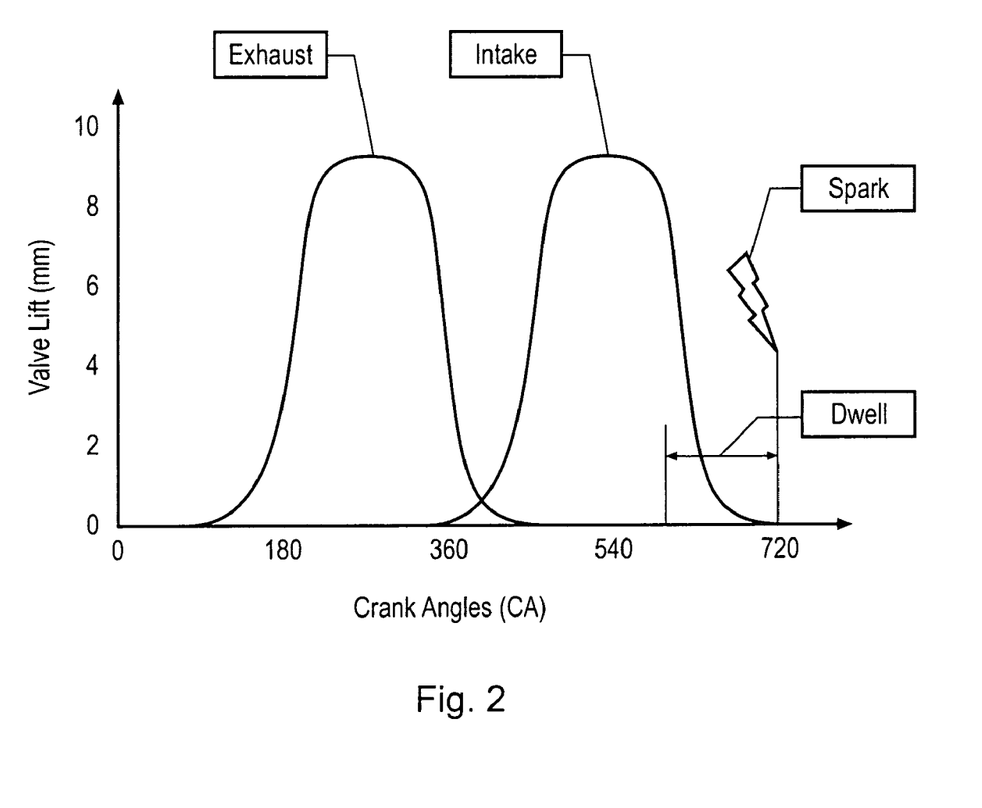
FIG. 2 is a diagram representing an example relationship between exhaust and intake valve timings and ignition timing.

FIG. 2 is a diagram illustrating the relationship between an exhaust valve timing, an intake valve timing and the ignition spark for a cycle of an engine such as is illustrated in FIG. 1. Thus, it can be seen that the exhaust valve opening precedes the intake valve opening, although the intake valve can commence opening before the exhaust valve is completely closed. As also illustrated in FIG. 2, there is a time required to build up charge in an ignition coil sufficient to create a spark in a spark plug. This period, where the ignition signal is HIGH, is called the dwell time. As spark and dwell timing is relative to crank position this is also commonly referred to a spark and dwell angle. The spark angle is set and the dwell time is calculated and converted into an angular value. The dwell angle is then combined with the spark angle resulting in a location where the ignition signal transitions from LOW to HIGH to begin dwell. In normal operation of an internal combustion engine it is common for dwell to have started before the intake valve has completely closed.

An example embodiment of the present invention is operable to avoid the risk of damage to an engine or its components as a result of valve failure in an electronic valve actuated internal combustion engine. A problem that the present invention addresses is that, when a valve failure is detected, it can be too late to cancel the injection of fuel (which takes place before or during the opening of the intake valve) or the charging of the ignition coil (the dwell time). As a result, if an intake valve sticks in a fully or partially open position, igniting the fuel in the cylinder with a spark plug spark could cause a backfire through the intake manifold and cause damage to components in the intake manifold such as, for example, the intake manifold pressure sensor, or damage to the intake manifold itself, especially if this is made of plastics material.

Figure 3:
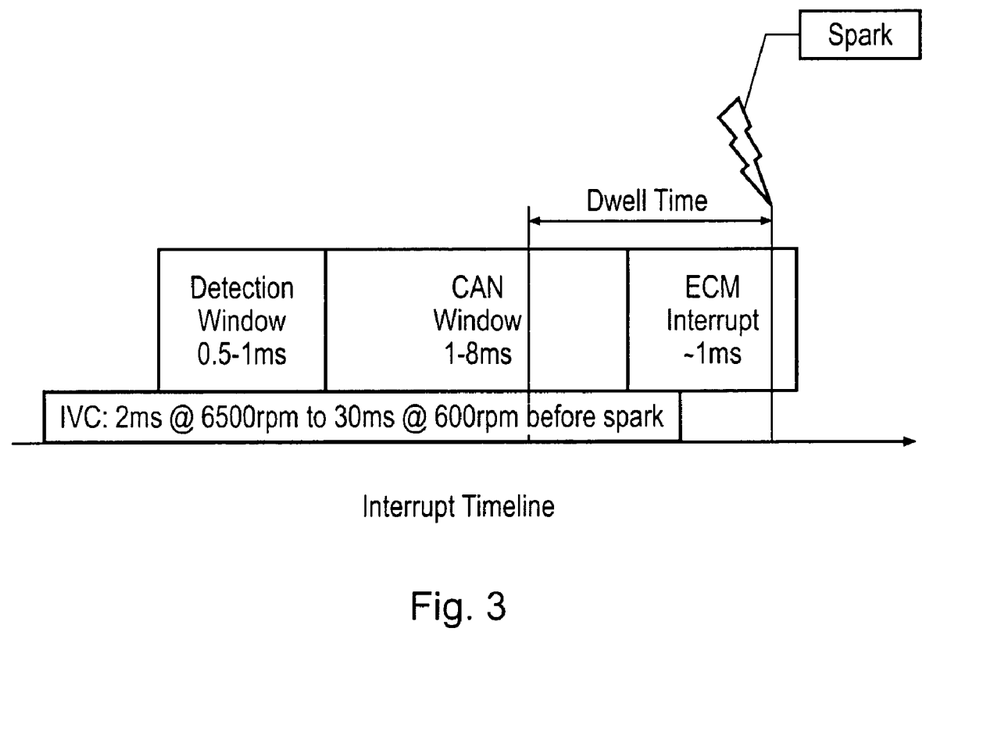
FIG. 3 is a schematic representation of an ignition timeline.

FIG. 3 provides an interrupt time line giving an example of timing of a valve failure in an electronic valve actuated internal combustion engine. Although in some operating conditions it may be possible to prevent combustion through the cancellation of fuelling and ignition requests, at higher speeds fuel injection will have already occurred and coil charging will have started. FIG. 3 illustrates the estimated time available for a spark interrupt signal to prevent spark in the event of a valve closure fault. There are three stages to generating a spark interrupt signal by the ECU 40. The valve closure fault is detected by the VCU 38 in a detection window of 0.5 to 1 milliseconds. The valve closure fault is then transmitted to the ECU 40. If communication of the valve closure fault was only though standard bus communication between the VCU 38 and the ECU 40, such as via the controller area network (CAN), then the CAN window can be between 1 and 8 milliseconds. The ECU interrupt time can be of the order of 1 millisecond. The lower block of FIG. 3 represents the intake valve opening period and indicates that the closure of the intake valve can be between 2 milliseconds (at 6500 revolutions per minute (rpm)) and 30 milliseconds (at 600 rpm) before the spark timing. The primary coil dwell time is typically between 3.5 and 4 milliseconds. Therefore, at high engine speeds it is possible that the ECU 40 will not be able to issue a spark interrupt signal before the dwell time starts, and therefore the ECU 40 would be unable to prevent ignition.

Figure 4:
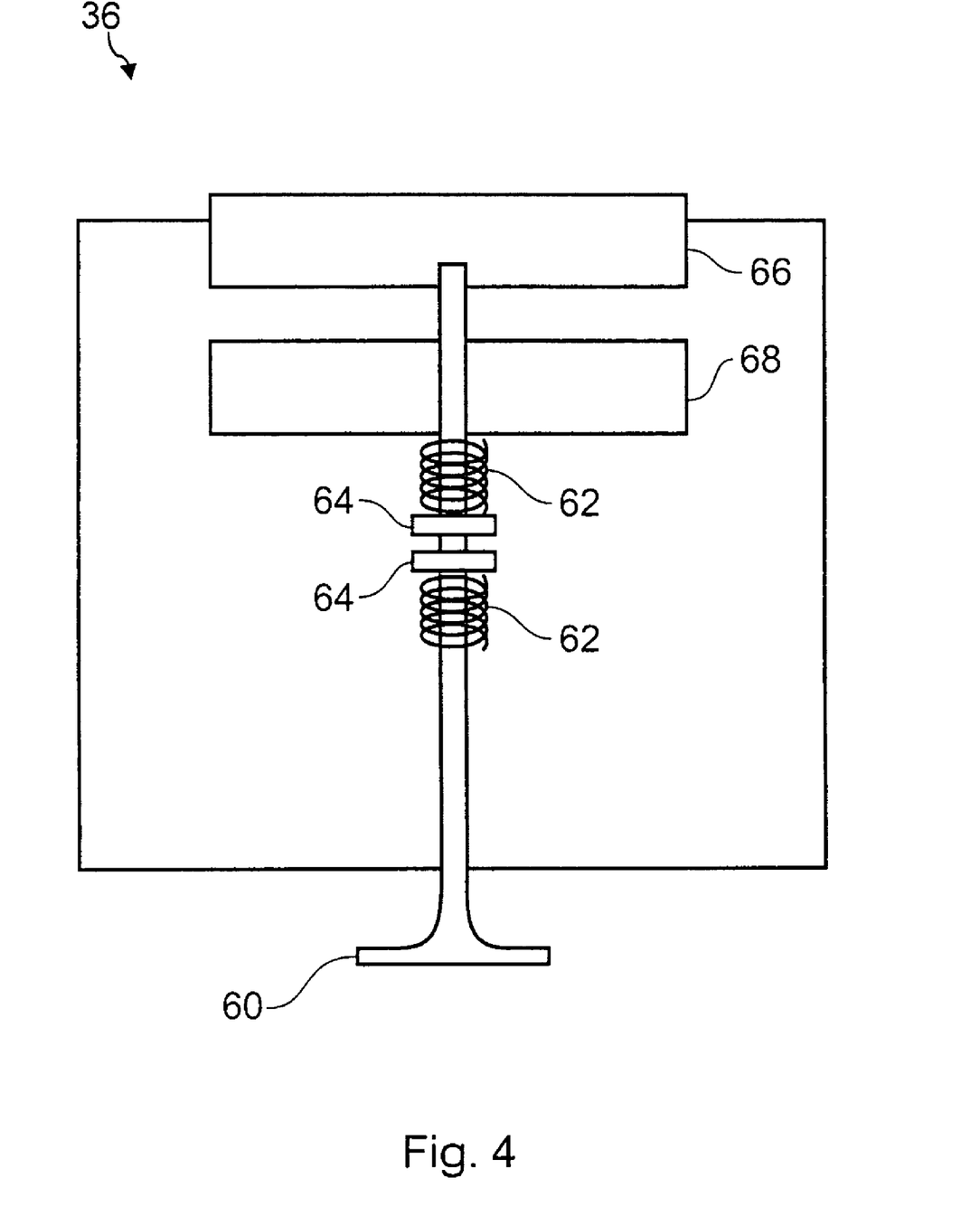
FIG. 4 is a schematic diagram of an example electronically activated valve.

FIG. 4 is a schematic diagram of an example of an electro-magnetically actuated valve mechanism 36. As illustrated in FIG. 4, the electro-magnetically actuated valve mechanism 36 comprises a valve 60, first and second springs 62 held in place by spring retainers 64, and upper and lower coils 66 and 68 to cause the reciprocating motion of the valve 60 in response to valve timing signals provided by the valve control unit 38 shown in FIG. 1.

Figure 5:
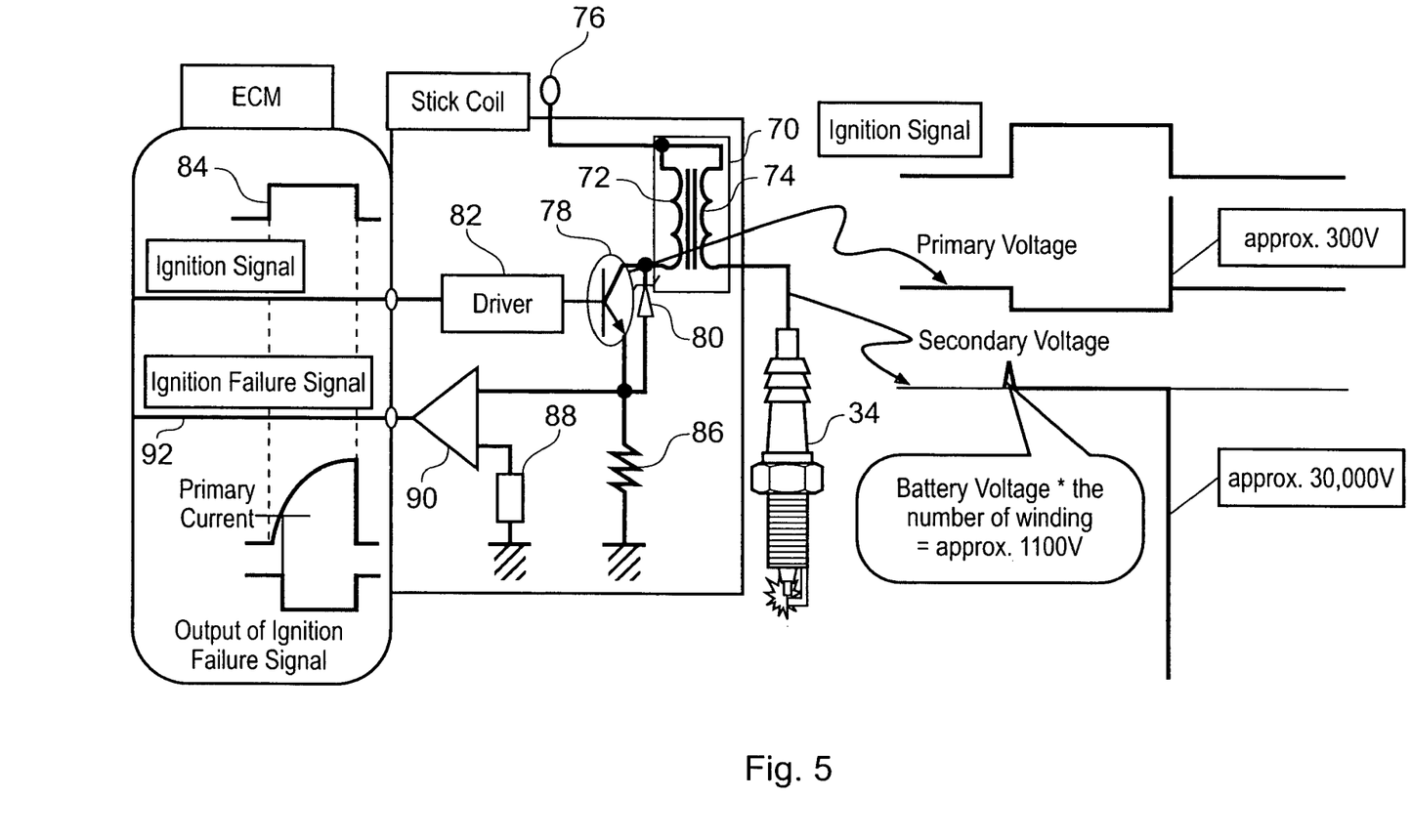
FIG. 5 is a schematic representation of an ignition system diagram.

FIG. 5 is a schematic ignition system diagram illustrating the components involved in generating an ignition spark through a spark plug 34. In the ignition system, a coil 70 is used to build up charge in a primary coil 72 which is then discharged through a secondary coil 74 to cause the spark plug 34 to generate a spark between its contacts. The charging and then discharging of the coil 70 is controlled by an ignition signal 84 which is provided by the engine control unit 40 illustrated in FIG. 1. In a first phase of operation when the ignition signal 84 has a first state (as illustrated in FIG. 5, a logical 1 state), a driver 82 is operable to drive a power transistor 78 to cause the primary coil 72 of the coil 70 to draw power from a battery voltage supply 76. When the ignition signal 84 switches to a second state (as illustrated in FIG. 5, a logical 0 state), the power transistor 78 is no longer driven by the driver 82 and the coil 70 then discharges via the secondary coil 74.

As illustrated in FIG. 5, an ignition failure signal 92 can be generated in response to a failure to generate ignition as detected by the voltage bridge formed by the rectifier 80 and the current detection resistor 86 which is connected to the amplifier 90, a second input of the amplifier 90 being connected to ground via an impedance 88.

Figure 6:
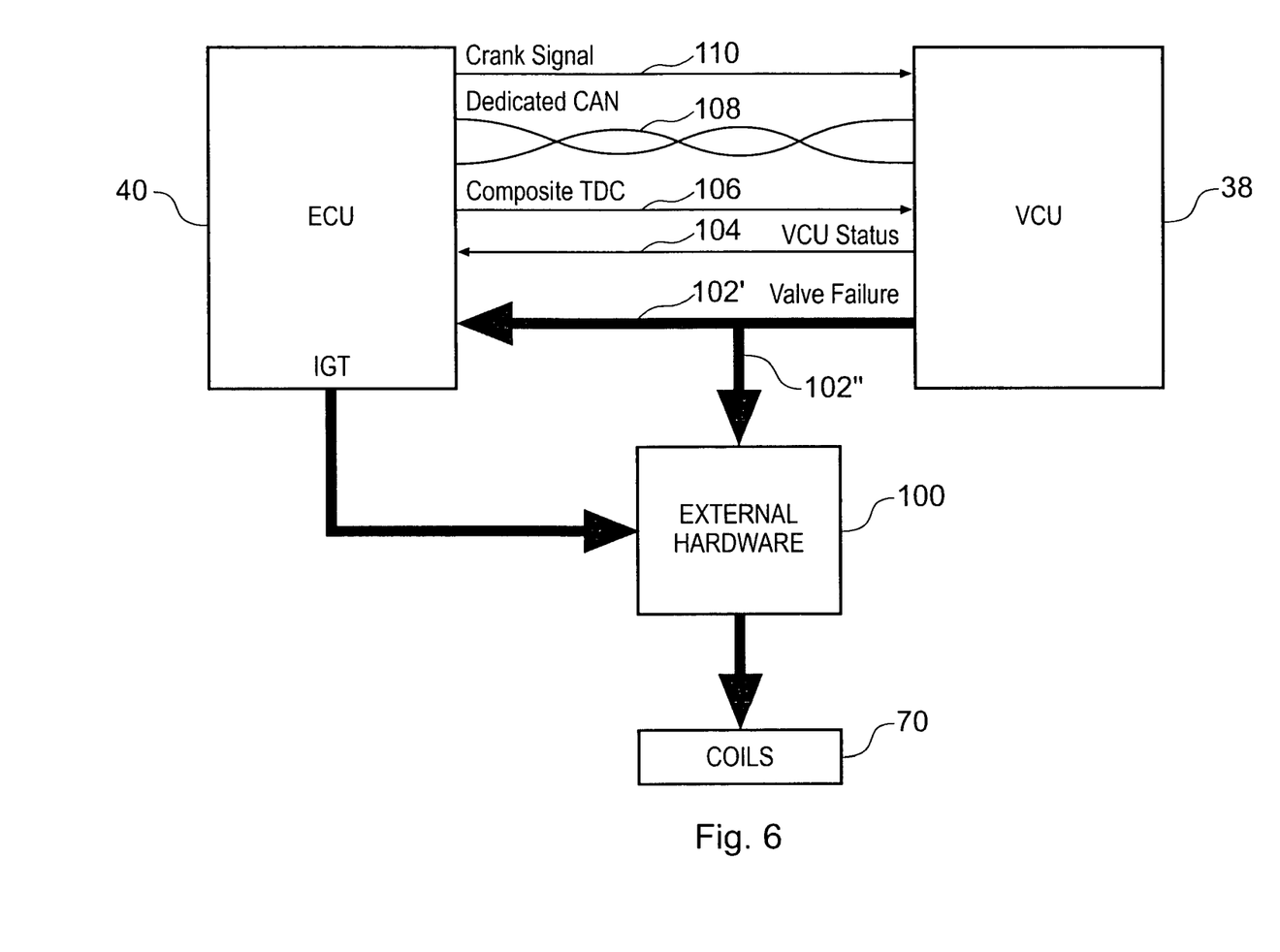
FIG. 6 is a schematic block diagram representing the interaction between a valve control unit and an engine control unit.

FIG. 6 is a schematic representation of an example configuration of the valve control unit 38, the engine control unit 40 and the coils 70. In the example shown in FIG. 6, optional external hardware 100 is provided between the engine control unit 40 and the coils 90. As shown in FIG. 6, valve failure signals are provided by the valve control unit 38 to the engine control unit 40 and to the external hardware 100 by valve failure control lines 102, 102' and 102". As well as the valve failure control lines, the engine control unit 40 receives valve control unit status signals from the valve control unit via a valve control status line 104. The valve control unit 38 receives composite top dead center (TDC) signals via a composite TDC line 106 from the engine control unit 40. The composite TDC signals indicate the top dead center timings for the cylinders of the engine 20. A dedicated bus (a dedicated CAN bus) 108 provides two way communication between the engine control unit 40 and the valve control unit 38. A crank signal line 110 is used by the engine control unit 40 to provide crank signals indicative of crank timings to the valve control unit 38.

The valve failure control lines can carry signals indicative of failure of one or more of the intake valves.

In one example, a separate dedicated valve failure control line can be provided for each cylinder of the engine to indicate the failure of an intake valve for that cylinder.

Alternatively, the cylinders can be grouped into sets of cylinders, with a valve failure control line being provided for a set of cylinders to indicate the failure of an intake valve for one or more of the cylinders of that set. For example, in the case of a V8 engine, the engine can be divided into two banks of four cylinders, and the cylinders can be divided into four sets, with each set comprising a corresponding cylinder of the first bank and the second bank. Alternatively, the engine can be divided into two sets, whereby each set represents one bank of four cylinders. In such a case, a signal provided on a valve failure control line is respect of a set of signals can be used initially to cause holding of the ignition signal in the first state (e.g., a HIGH state) for each cylinder of the set. Separate signals could then be provided via the CAN bus to identify a particular cylinder in the set of cylinders for which valve fault had been detected. The ignitions signal for the other cylinders of the set of cylinders could then be permitted to change to the second state (e.g., a LOW state) to permit ignition to occur at an appropriate timing, while the ignition signal for the cylinder for which a valve fault had been detected could be maintained in the first state for the appropriate number of cycles.

Also, the valve failure signal could be encoded for transmission on a common valve failure control line. However, in such a case, appropriate measures are needed to decode the signals and also measures may be needed to screen of the valve failure control line to avoid noise affecting the encoded signals In the example embodiment described herein, a valve failure control signal is represented by a change from a logical 0 to a logical 1 for ease of detection by the engine control unit 40. The valve failure control lines 102' from the valve control unit 38 to the engine control unit 40 form first fault signal paths. The fault signal control lines 102" from the valve control unit 38 to the external hardware 100 form second fault signal paths.

Figure 7:
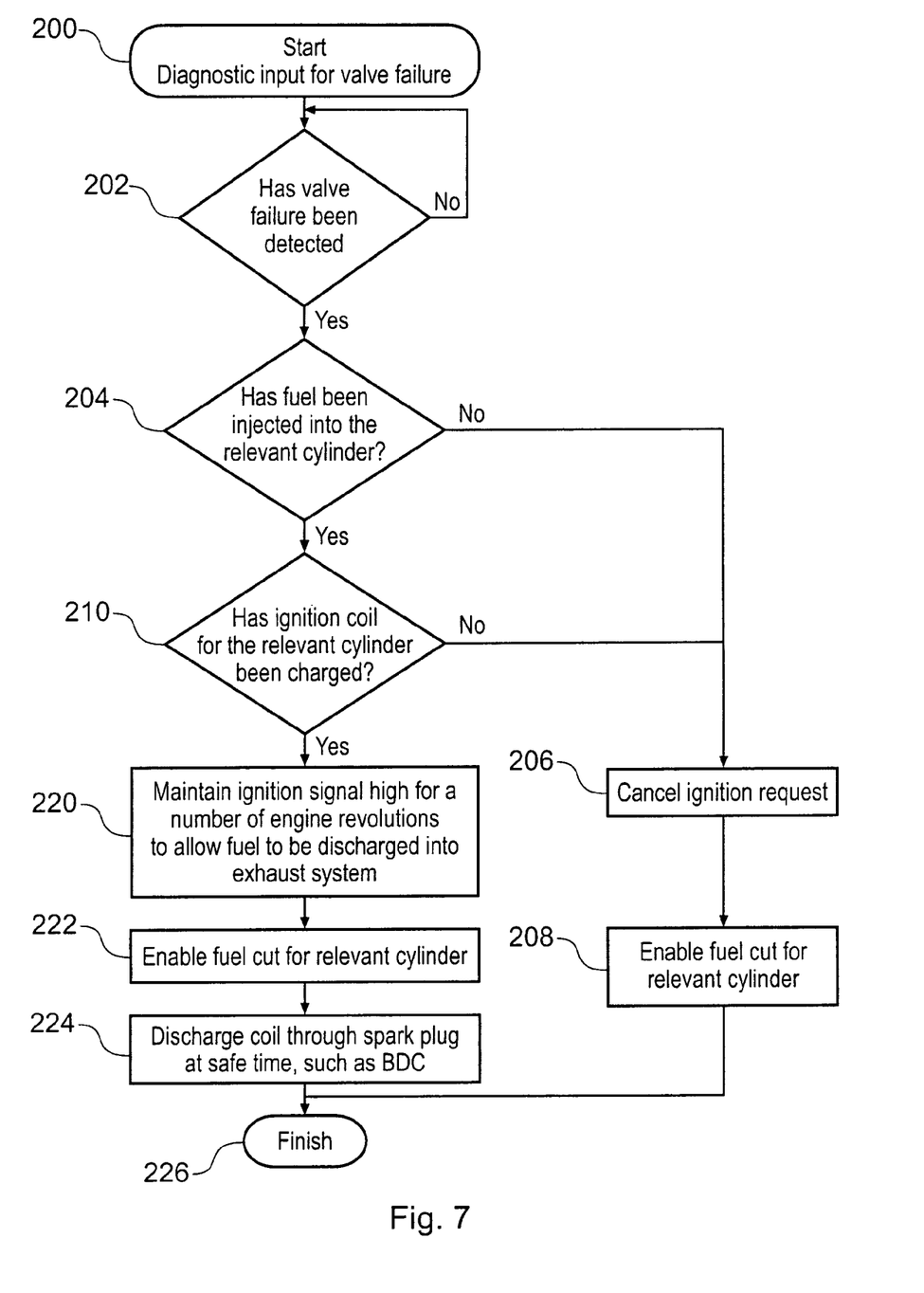
FIG. 7 is a flow diagram of an example of controlled discharge of a charged coil in the event of valve failure.

FIG. 7 is a flow diagram illustrating the operation of the engine control unit in response to an electromagnetically operated valve failure.

Step 200 represents the start of the process with the engine control unit 40 having diagnostic input for valve failure.

The engine control unit 40 detects in step 202 whether it has received a valve failure control signal indicative that valve failure has been detected. The engine control unit 40 loops at this stage in the process until valve failure has been detected.

At step 204, the engine control unit determines whether fuel has been injected into the relevant cylinder. It is known whether fuel has been injected or not as a result of the valve status and the point in the timing cycle. If fuel has not been injected into the relevant cylinder, then at step 206, the current ignition request is cancelled, and at step 208, fuel cut out for the relevant cylinder is enabled.

If, at step 204, it is determined that fuel has been injected into the relevant cylinder, the engine control unit 40 then determines at step 210 whether the ignition coil for the relevant cylinder has been charged. Once again, this can be determined from the point in the timing cycle for the relevant cylinder. If the ignition coil has not been charged for the relevant cylinder, then at step 206, the ignition request for the relevant cylinder is cancelled, and at step 208, a fuel cut out for the relevant cylinder is enabled.

If at step 210 it is determined that the ignition coil for the relevant cylinder has been charged, then at step 220, the engine control unit is operable to maintain the ignition signal high for a number of engine revolutions, to allow fuel to be discharged into the exhaust system.

In step 222, a fuel cut out for the relevant cylinder is enabled.

Following the aforementioned number of engine revolutions, in step 224, the coil for the relevant signal is discharged through the spark plug at a safe time. A suitable safe time is at or around the bottom dead center time. The process then finishes at step 226.

In the flow diagram of FIG. 7, it is indicated that the ignition signal is maintained high for a number of engine revolutions. The number of engine revolutions involved can be a fixed number, for example of one or more engine revolutions. Advantageously, the ignition signal is maintained high for a plurality of revolutions. In different examples, 2, 3, 4, 5, 6, 7, 8, 9 or 10 engine revolutions may be used. The number of engine revolutions chosen in any particular example is a number of engine revolutions which enables sufficient fuel to be discharged from the exhaust system so that the mixture will be too lean at the time the coil is subsequently discharged through the spark plug so that no ignition will occur.

As an alternative to using a fixed number of revolutions, a number of revolutions can be determined using feedback from the downstream oxygen sensors 48 and 52 and/or further sensors provided downstream of the engine 20.

Figure 8:
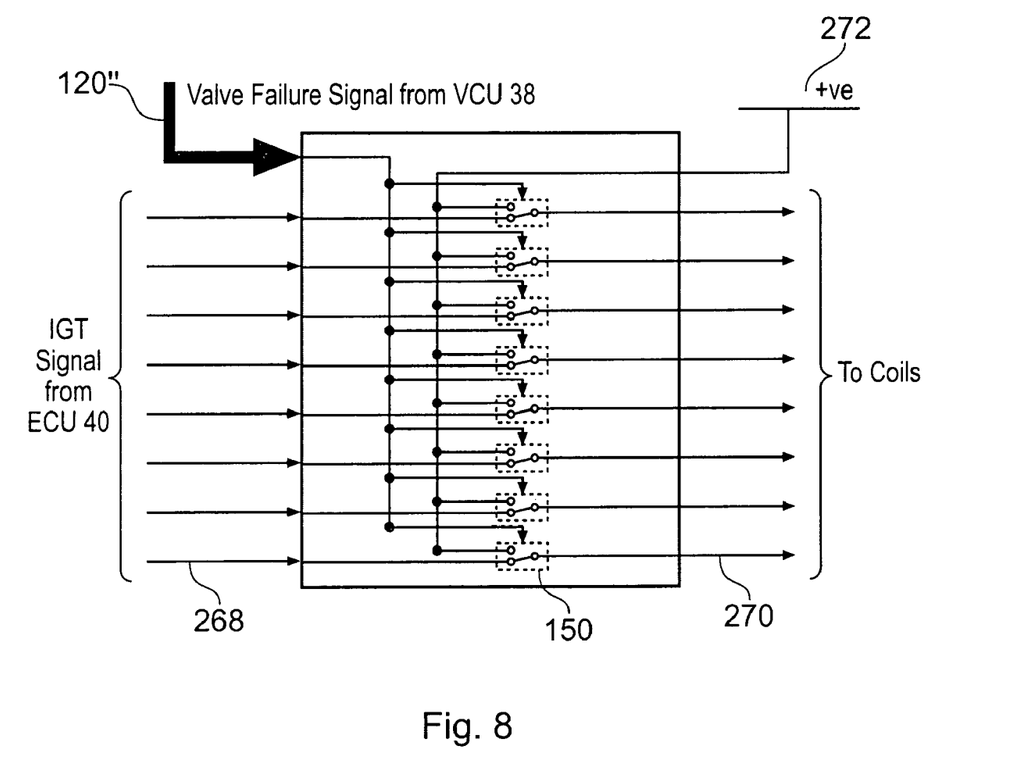
FIG. 8 is a schematic block diagram of a hardware unit.

FIG. 8 is illustrative of an example of the external hardware 100. The example shown in FIG. 8 is for an eight cylinder engine whereby eight separate coils are provided, one for each cylinder. FIG. 8 illustrates the provision of the ignition timing signals (IGT) from the engine control unit 40 and the provision of the valve failure signals on the second fault control paths 120" from the valve control unit 38. As shown in FIG. 8, the external hardware unit 100 comprises a separate switch 150 for each of the ignition signal lines from the engine control unit. In response to a valve failure signal on an appropriate valve failure signal control line, the respective switch 150 is activated to switch from the ignition timing signal lines 268 from the engine control unit to a predetermined voltage signal 272 (in FIG. 8 a positive voltage signal) in order to hold the ignition timing signal provided on the ignition timing signal lines 270 to the coils 70. The provision of the external hardware unit 100 can be advantageous for high speed or multi-cylinder engines to ensure the latching of the ignition control signal at the high logical value to prevent discharge from a coil for a cylinder for which a valve failure has been detected.

Figure 9:
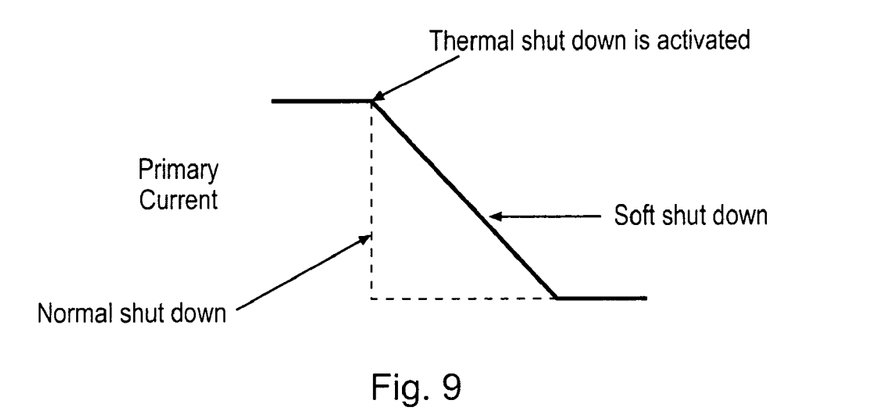
FIG. 9 is a representation of a soft discharge option for a coil.

To avoid a coil overheating due to being held at a high voltage, appropriate measures can be employed, if necessary. For example, the coils can be provided with thermal protection to shut down the coil where the ignition signal is held high for a long time. For example, a temperature sensing element can be provided for a coil to vary a voltage signal with coil temperature, and when this voltage exceeds a threshold, the coil can be caused to automatically enter a soft shut down mode to discharge the primary coil and to protect the coil from overheating. The soft shut down mode can be operable to discharge the primary coil gradually by limiting the secondary voltage to a low voltage (e.g., less than 1 kV) and thereby prevent ignition at a spark plug. FIG. 9 is a schematic representation of such a soft shut down.

Accordingly, there has been described a system and method for preventing the ignition of fuel in an internal combustion engine cylinder in the event of an electromagnetically activated intake valve. By holding an ignition signal for the cylinder in a first state for a number of cycles of the engine, fuel in the cylinder can be permitted to dissipate, preventing unwanted combustion of the cylinder on subsequently discharging the coil.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. An internal combustion engine comprising:
   at least one cylinder having at least one intake valve;
   an electronic valve actuation mechanism for activating the
      at least one intake valve;

at least one ignition coil responsive to an ignition signal for the at least one cylinder such that charge can accumulate in the coil during part of an engine cycle when the ignition signal has a first state, which charge is used to cause ignition for the at least one cylinder when the ignition signal for the cylinder changes to a second state for a further part of the engine cycle; and a control system responsive to an intake valve fault in respect of the at least one cylinder being detected following activation of the at least one intake valve to hold the ignition signal for the at least one cylinder in the first state for a number of cycles of the internal combustion engine.

2. The internal combustion engine of claim 1, wherein the control system is operable to cause the ignition signal for the at least one cylinder to change to the second state after the number of cycles of the internal combustion engine approximately at a bottom dead center position of the at least one cylinder.

3. The internal combustion engine of claim 1, wherein the control system includes:

a valve control unit operable to control the at least one intake valve; and an engine control unit operable to generate ignition signals, including said ignition signal for the at least one intake valve, for controlling ignition;

the valve control unit being connected by one or more first fault signal paths to the engine control unit to pass a fault signal to the engine control unit when an intake valve fault is detected in respect of at least one cylinder.

4. The internal combustion engine of claim 3, wherein the engine control unit is operable to hold the ignition signal for the at least one cylinder in the first state for a number of cycles of the internal combustion engine in response to receipt of said fault signal.

5. The internal combustion engine of claim 3, wherein:

the internal combustion engine comprises a plurality of cylinders organized into n sets of cylinders, where n is an integer number;

the one or more first fault signal paths comprises n first fault signal paths, each associated with a corresponding set of the cylinders, whereby a fault signal provided on a given one of the first fault signal paths is representative of an intake valve fault for at least one cylinder of a given set of the plurality of cylinders; and the engine control unit is operable to hold the ignition signal for each cylinder of the given set of the plurality of cylinders in the first state for a number of cycles of the internal combustion engine in response to receipt of said fault signal.

6. The internal combustion engine of claim 3, wherein the engine control unit is operable to pass the generated ignition signals, including said ignition signal for the at least one intake valve, for controlling ignition via a hardware interface unit, the valve control unit being connected by one or more second fault signal paths to pass a fault signal to the hardware interface unit when an intake valve fault is detected in respect of at least one cylinder.

7. The internal combustion engine of claim 6, wherein the hardware interface unit is operable to hold the ignition signal for the at least one cylinder in the first state for a number of cycles of the internal combustion engine in response to receipt of said fault signal.

8. The internal combustion engine of claim 6, wherein:

the internal combustion engine comprises a plurality of cylinders organized into n sets of cylinders, where n is an integer number;

the internal combustion engine further comprises n second fault signal paths, each associated with a corresponding set of the cylinders, whereby a fault signal provided on a given one of the second fault signal paths is representative of an intake valve fault for at least one cylinder of a given set of the plurality of cylinders;

the hardware interface unit is operable to hold the ignition signal for each cylinder of the given set of the plurality of cylinders in the first state for a number of cycles of the internal combustion engine in response to receipt of said fault signal.

9. The internal combustion engine of claim 1, wherein the number of cycles is a plurality of cycles.

10. A method of operating an internal combustion engine that comprises at least one cylinder having at least one intake valve, an electronic valve actuation mechanism for activating the at least one intake valve and at least one ignition coil responsive to an ignition signal for the at least one cylinder such that charge can accumulate in the coil during part of an engine cycle when the ignition signal has a first state, which charge is used to cause ignition for the at least one cylinder when the ignition signal for the cylinder changes to a second state for a further part of the engine cycle, the method comprising:

detecting an intake valve fault in respect of the at least one cylinder; and in response to detecting the intake valve fault, holding the ignition signal for the at least one cylinder in the first state for a number of cycles of the internal combustion engine.

11. The method of claim 10, comprising:

changing the ignition signal for the at least one cylinder to the second state after the number of cycles of the internal combustion engine approximately at a bottom dead center position of the at least one cylinder.

12. The method of claim 10, wherein a valve control unit, which is operable to control the at least one intake valve, passes a fault signal via a signal path to an engine control unit when the intake valve fault is detected, which engine control unit is operable to generate ignition signals, including said ignition signal for the at least one cylinder, for controlling ignition.

13. The method of claim 12, wherein the engine control unit holds the ignition signal for the at least one cylinder in the first state for the number of cycles of the internal combustion engine in response to receipt of said fault signal.

14. The method of claim 12, wherein:

the internal combustion engine comprises a plurality of cylinders which are organized into n sets of cylinders, where n is an integer number; and n first fault signal paths are provided, each associated with a corresponding set of the cylinders such that a fault signal provided on a given first fault signal path is representative of an intake valve fault for at least one cylinder of a given set;

the method further comprises the engine control unit holding the ignition signal for each cylinder of the given set in the first state for the number of cycles of the internal combustion engine in response to receipt of said fault signal.

15. The method of claim 12, wherein the engine control unit is operable to pass the generated ignition signals for controlling ignition via a hardware interface unit, the valve control unit being connected by one or more second fault signal paths to pass a fault signal to the hardware interface unit when an intake valve fault is detected in respect of the at least one cylinder.

16. The method of claim 15, wherein the hardware interface unit holds the ignition signal for the at least one cylinder in the first state for the number of cycles of the internal combustion engine in response to receipt of said fault signal.

17. The method of claim 15, wherein:

the internal combustion engine comprises a plurality of cylinders which are organized into n sets of cylinders, where n is an integer number; and n second fault signal paths are provided, each associated with a corresponding set of the cylinders, whereby a fault signal provided on a given one of the second fault signal paths is representative of an intake valve fault for at least one cylinder of the set, the method further comprises the hardware interface unit holding the ignition signal for each cylinder of the set in the first state for the number of cycles of the internal combustion engine in response to receipt of said fault signal.

18. The method of claim 10, wherein the number of cycles is a plurality of cycles.

19. An internal combustion engine comprising:

cylinder means, each having intake valve means, electronic valve actuation means for activating the intake valve means and ignition coil means responsive to an ignition signal for a cylinder means such that charge can accumulate in the ignition coil means during part of an engine cycle when the ignition signal has a first state, which charge is used to cause ignition for the cylinder means when the ignition signal for the cylinder means changes to a second state for a further part of the engine cycle; and control means responsive to an intake valve fault in respect of a cylinder means being detected following activation of the intake valve means thereof to hold the ignition signal for the cylinder means in the first state for a number of cycles of the internal combustion engine.

\* \* \* \* \*